United States Patent [19]

Okada et al.

[11] Patent Number: 4,679,235
[45] Date of Patent: Jul. 7, 1987

[54] TELEVISION SIGNAL TRANSMISSION SYSTEM

[75] Inventors: Takashi Okada, Kanagawa; Takao Mogi; Hiroyuki Kobayashi, both of Tokyo; Katsuyuki Ohi, Kanagawa, all of Japan

[73] Assignee: Sony Corporation, Tokyo, Japan

[21] Appl. No.: 625,291

[22] Filed: Jun. 27, 1984

[30] Foreign Application Priority Data

Jul. 7, 1983 [JP] Japan ................................ 58-123615

[51] Int. Cl.⁴ ........................................... H04N 7/167
[52] U.S. Cl. ....................................... 380/20; 380/17
[58] Field of Search .......................... 358/114, 123, 124

[56] References Cited

U.S. PATENT DOCUMENTS 4,322,745 3/1982 Sacki et al. .......................... 358/114

FOREIGN PATENT DOCUMENTS

841627 7/1960 United Kingdom ................ 358/124

Primary Examiner—Stephen C. Buczinski
Assistant Examiner—Aaron J. Lewis
Attorney, Agent, or Firm—Lewis H. Eslinger; Alvin Sinderbrand

[57] ABSTRACT

A television signal transmission system transmits a television signal having a polarity inverted portion in association with a scene change and a polarity inverted portion after a predetermined time interval independently of the scene change.

6 Claims, 15 Drawing Figures

| | | | | | | | | | |
|---|---|---|---|---|---|---|---|---|---|
| 1V | 0 | 0 | 1 | 0 | 0 | 0 | 1 | 0 | |
| 2V | 0 | 0 | 1 | 0 | 1 | 1 | 0 | 0 | } SB |
| 3V | 0 | 0 | 1 | 0 | 1 | 1 | 1 | 1 | |
| 4V | 0 | 0 | 1 | 0 | 0 | 0 | 0 | 1 | |
| 5V | $L_7$ | $L_6$ | $L_5$ | $L_4$ | $L_3$ | $L_2$ | $L_1$ | $L_0$ | |
| 6V | $D_7$ | $D_6$ | $D_5$ | $D_4$ | $D_3$ | $D_2$ | $D_1$ | $C_4$ | } SD |
| 7V | $D_0$ | $I_7$ | $I_6$ | $I_5$ | $I_4$ | $I_3$ | $I_2$ | $C_3$ | |
| 8V | $I_1$ | $I_0$ | 1 | $C_2$ | 1 | $C_1$ | $C_0$ | P | |
| 9V | $L_7$ | $L_6$ | $L_5$ | $L_4$ | $L_3$ | $L_2$ | $L_1$ | $L_0$ | |
| 10V | $D_7$ | $D_6$ | $D_5$ | $D_4$ | $D_3$ | $D_2$ | $D_1$ | $C_4$ | } SD |
| 11V | $D_0$ | $I_7$ | $I_6$ | $I_5$ | $I_4$ | $I_3$ | $I_2$ | $C_3$ | |
| 12V | $I_1$ | $I_0$ | 1 | $C_2$ | 1 | $C_1$ | $C_0$ | P | |
| 13V | $L_7$ | $L_6$ | $L_5$ | $L_4$ | $L_3$ | $L_2$ | $L_1$ | $L_0$ | |
| 14V | $D_7$ | $D_6$ | $D_5$ | $D_4$ | $D_3$ | $D_2$ | $D_1$ | $C_4$ | } SD |
| 15V | $D_0$ | $I_7$ | $I_6$ | $I_5$ | $I_4$ | $I_3$ | $I_2$ | $C_3$ | |
| 16V | $I_1$ | $I_0$ | 1 | $C_2$ | 1 | $C_1$ | $C_0$ | P | |

FIG. 7

| | | | | | | | | | |
|---|---|---|---|---|---|---|---|---|---|
| 1V | 0 | 0 | 0 | 1 | 0 | 0 | 0 | 1 | |
| 2V | 0 | 0 | 0 | 1 | 0 | 0 | 1 | 0 | } SS |
| 3V | 0 | 0 | 0 | 1 | 1 | 1 | 1 | 1 | |
| 4V | 0 | 0 | 0 | 1 | 1 | 1 | 0 | 0 | |

TELEVISION SIGNAL TRANSMISSION SYSTEM

BACKGROUND OF THE INVENTION

1. Field of the Invention

The present invention relates to a system for broadcasting a scrabled television signal.

2. Description of the Prior Art:

Recently, "pay-TV" systems have become popular in the U.S.A. In the pay-TV systems, viewers who have contracts with the broadcasting station can correctly receive a program, while viewers who do not have contracts with the broadcasting station cannot. In order to prevent correct reception by nonsubscribers, methods for processing video and audio signals in some manner are used. According to such a method, when a program is received by a television set of a nonsubscriber, he cannot obtain correct picture and voice.

Thus, these methods are called scrambling methods or scrambled broadcast. For this purpose, various scrambling methods for processing video and audio signals have been proposed. Then, in the pay-TV system using such a scrambling method, a viewer who has a contract with the station is provided a decoder for decoding (or descrambling) the scrambled signal to obtain the original signal.

Figure 1A:
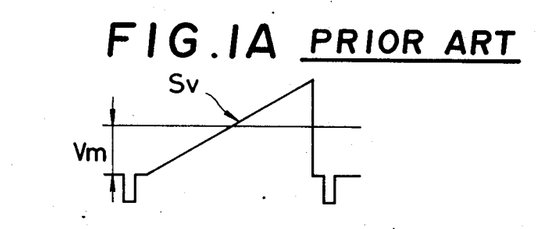
FIGS. 1A and 1B respectively show waveforms of signals for explaining scrambling for performing the polarity inversion of a video signal.
Figure 1B:
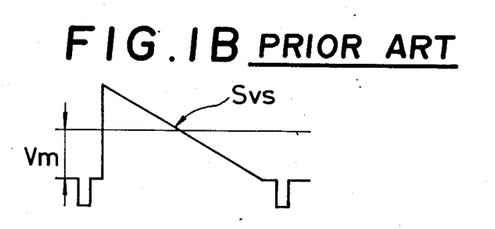

One scrambling method is known in which a television signal is inverted at a predetermined turn-up level with respect to white and black levels. For example, a video signal $S_v$ as shown in FIG. 1A is inverted at a turn-up level $V_m$ set between white and black levels to obtain a signal $S_{vs}$ as shown in FIG. 1B. In this case, if horizontal and vertical synchronizing signals of the television signal are inverted, the original signal cannot be reproduced by a television set of a subscriber. Therefore, only the video period is inverted.

When such a scrambling method utilizing level inversion is adopted in actual broadcasting, a scrambling pattern is formed by combining level-inverted and non-inverted fields. The obtained scrambling pattern is repeated to transmit the scrambled television signal.

An identification signal which indicates that the broadcast program is scrambled and a key code signal for allowing descrambling of the program received by a television set of a subscriber are inserted at predetermined positions of a vertical blanking period. In one scrambling method, for example an identification signal of a predetermined level is inserted in the sixteenth scanning period of the vertical blanking period and a key code signal is inserted in the seventeenth and eighteenth horizontal scanning periods (to be referred to as 17H and 18H hereinafter).

When a television signal scrambled by this method is received, the inverted field period is detected by the key code signal, and the video signal in this period is reinverted. According to this method, when a scrambled signal is subject to a distorting influence by a transmission system, descrambling at a receiver side may not result in reproduction of an original waveform.

For example, when a polarity-inverted signal is reinverted by a decoder, a level difference may be generated or the waveform may be distorted. When a descrambled signal is supplied to a TV receiver, flicker occurs at the polarity-inverted portion of the picture. Such flicker is particularly noticeable in the case of a still image. When a scrambled program broadcast from a station is recorded by a VTR, flicker tends to become more noticeable since a VTR is nonlinear in a DC manner as well as in an AC manner.

The present applicant has previously proposed a scrambling broadcast system free from this problem in Japanese Patent Application No. 57-13669 and the like. This system will be described briefly below.

Figure 2A:
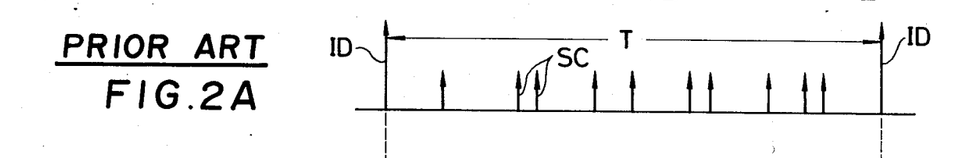
FIGS. 2A to 2E are respectively timing charts for explaining scrambling in association with a scene change.
Figure 2B:
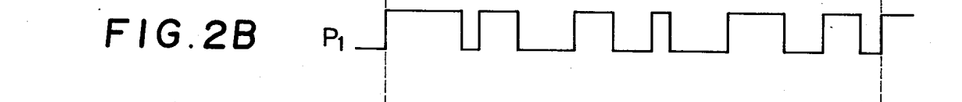

Referring to FIG. 2A, a predetermined period T (e.g., 60 seconds) of a television signal of a specific program to be scrambled is preset by an identification signal ID. A scene change of such a program is detected so as to obtain a scene change signal SC. Then, a key signal pattern $P_1$ as shown in FIG. 2B is prepared. The leading and trailing edges of the pattern $P_1$ coincide with the field period.

Figure 2C:
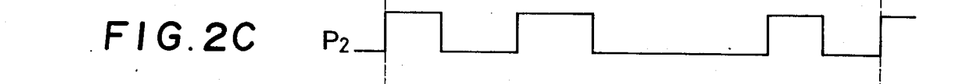
Figure 2D:
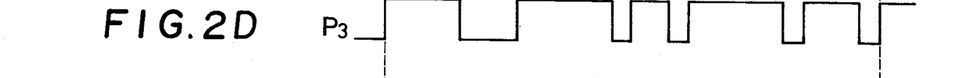
Figure 2E:
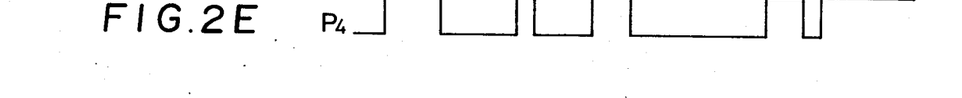

In accordance with the signals ID and SC and the pattern $P_1$ as described above, one of scrambling patterns $P_2$, $P_3$ and $P_4$ (FIGS. 2C, 2D and 2E) is generated which determines the timing of the polarity inversion. Scrambling is performed by inverting the polarity of a video signal period of a television signal of a specific program in accordance with a high level portion of the pattern $P_2$, $P_3$ or $P_4$, for example. The key signal pattern $P_1$ is repeated at the period T.

The pattern $P_2$ is obtained by ANDing the signal SC and the pattern $P_1$ and inverting the level by the AND oroduct. The oattern $P_3$ rises with the signal ID or SC and falls at the trailing edge of the pattern $P_1$. The pattern $P_4$ rises with the AND product of the signal ID or SC and the pattern $P_1$ and falls at the trailing edge of the signal SC. Various other scrambling patterns for determining the timing of the polarity inversion may also be formed in accordance with the signals ID and SC and the pattern $P_1$.

According to the method described above, the polarity inversion is always performed together with a scene change. Scene flickering can thus be deemphasized.

However, since the polarity inversion of the scrambled signal is limited to the scene change timing, it is performed about once for every few seconds. When this scrambled signal is received by the conventional receiver, the normal scene is displayed for a few seconds to several tens of seconds when the polarity is normal. In addition, even if the polarity of the signal is inverted, the motion of the people and characters can be easily understood when the inverted period is long. Therefore, the scrambling effect becomes low, thereby impairing secrecy as the main feature of scrambled broadcast.

SUMMARY OF THE INVENTION

It is an object of the present invention to provide a system capable of guaranteeing secrecy of scrambled broadcast, i.e., of improving the scrambling effect when the scrambled broadcast is received by the conventional receiver or monitor.

DETAILED DESCRIPTION OF THE PREFERRED EMBODIMENT

Figure 3:
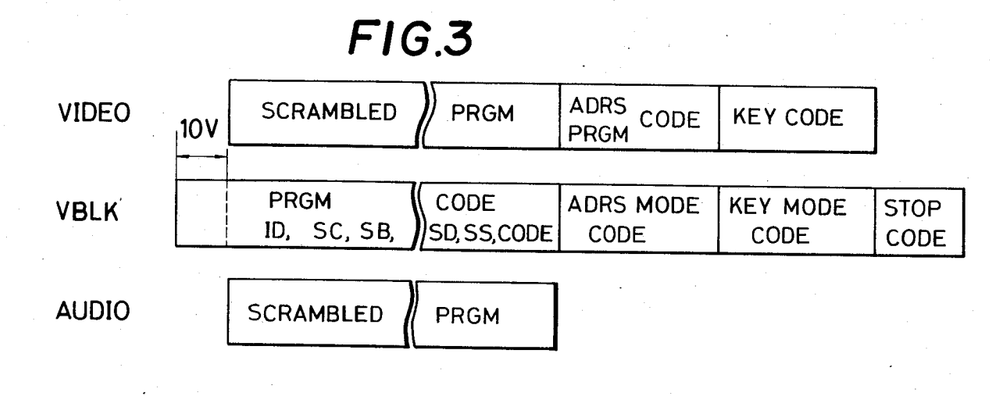
FIG. 3 shows an embodiment of a format of scrambled television signal.

FIG. 3 shows an embodiment of the format of a television signal for scrambling broadcast transmitted from a broadcasting station.

In a video signal period, a scrambled specific program, an address code, a program code and a key code are transmitted in the order named. In the vertical blanking period, the program code, codes ID and SC, codes SB, SD and SS to be described later, an address mode code, a key mode code, a stop mode and the like are transmitted in the order named. In the audio channel, a scrambled program is transmitted. The audio signal may be scrambled by various methods in accordance with the scrambling patterns as described above.

The address code is obtained by coding a predetermined number assigned to each subscriber. The key code is a decoding key code for descrambling a scrambled signal and has a code for designating, for example, the pattern $P_1$ shown in FIG. 2. According to this embodiment of the present invention, the key code is added at the end of the program. Thus, the scrambled broadcast may not be descrambled unless it is once recorded by a VTR or the like. Thus, a scrambled broadcast is recorded on a tape by a VTR and a key code is recorded at the end of the program. The key code is stored in a memory or the like and the reproduced signal is descrambled in accordance with the key code. When the key code is added at the end of the program, the program may not be watched in real time.

Alternatively, the key code may be added at the beginning of the program or may be added both at the beginning and end of the program. Still alternatively, the key code may be added at the beginning of the program, and may be stored in the memory after a predetermined period of time from detection of the key code (e.g., after most of the program has been broadcast).

A program code is a code which designates the key code. In order to prevent decoding of a program by nonsubscribers, the key code is changed for each year, month, week, day, program or the like. Accordingly, when a plurality of programs are recorded on a tape or when a plurality of tapes are to be reproduced, various key codes are stored in a memory.

Each program code has contents of a corresponding program. The memory stores each pair of a program code and a key code corresponding to each other. Accordingly, a key code corresponding to a program may be selected by a program code reproduced during reproduction of the program. In the embodiment of the present invention, the program code is expressed in, for example, 24 bits by the date of the broadcast and the program number.

The address mode code is transmitted during the transmission period of the address code and indicates that the address code is currently being transmitted.

The key mode code also indicates that the key code is being transmitted. The stop code indicates that the scrambled broadcasting program is over.

Each code is transmitted as nonreturn-to-zero (NRZ) modulated binary signals each having predetermined number of bits. In the vertical blanking period, each code is inserted in 17H and 18H, respectively. The program code is inserted in the vertical blanking periods for 10V (V: field) before the program starts and is also inserted in the video period after the program has finished.

The SB, SD and SS codes according to the present invention will be described in detail.

The scrambled television signal transmitted from a television station is characterized by two scrambling modes: the SC mode for performing the polarity inversion of the video signal in accordance with the method of FIG. 2 in association with the signal SC; and the SD mode for performing the polarity inversion on the basis of the SD code.

Figure 4:
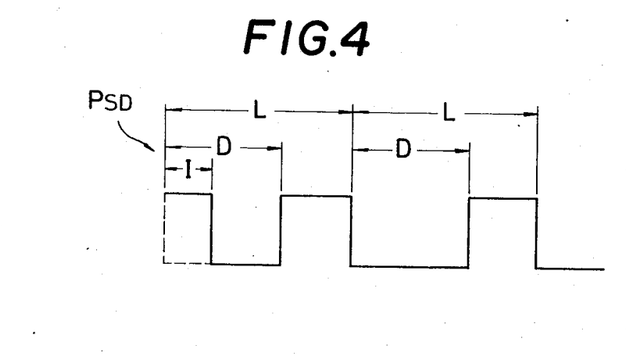
FIG. 4 shows a scrambling pattern in an SD mode.

The polarity inversion in the SD mode is performed independently of the signal SC and the scrambling patterns $P_2$, $P_3$ and $P_4$. For example, the polarity inversion is performed in accordance with the scrambling pattern $P_{SD}$ (FIG. 4) of the SD mode. The scrambling pattern $P_{SD}$ has a period L shown in FIG. 4. The period L has one inversion period D and one noninversion period L-D and also includes a lag period I when the SD mode is started. The SD code comprises three data L, D and I. For example, L=15V and D =11V can be given. The SB code represents the start of the SD mode and the presence of the following SD code. The SS code represents the end of the SD mode.

These two scrambling modes SC and SD are arbitrarily selected when scrambling is performed at the sending-side apparatus. For example, scrambling can be normally performed in the SC mode and is switched to the SD mode when the scene change is not performed for a long period of time, thereby improving the scrambling effect.

Figure 5:
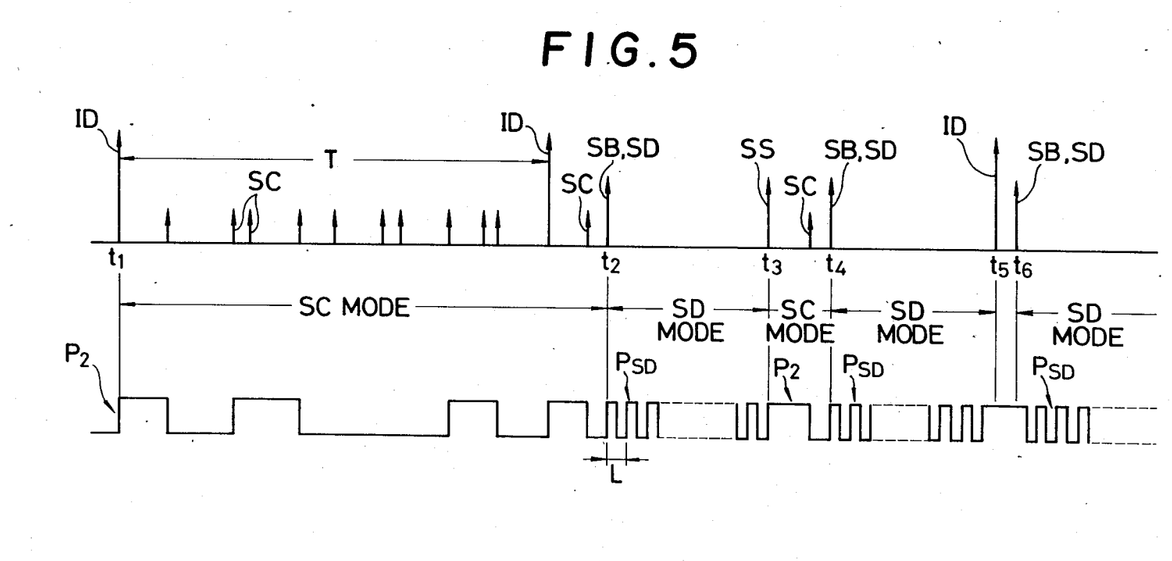
FIG. 5 is a timing chart showing an embodiment of the SC mode and an SD mode.

FIG. 5 shows an embodiment of the SC and SD modes. During a time interval between time $t_1$ and time $t_2$, the scrambling is performed in the SC mode in accordance with the scrambling pattern $P_2$ and the pulses SC. At time $t_2$, the SD mode is set in accordance with the SB and SD codes. In this case, the polarity inversion is performed in accordance with a scrambling pattern $P_{SD}$ The SD mode is then ended by the SS code at time $t_3$. The SC mode is set during a time interval between time $t_3$ and time $t_4$. The SC mode is switched to the SD mode from time $t_4$.

When the ID code is received at time $t_5$ while the SD mode is executed, the SD mode is interrupted and changed to the SC mode. The ID code is inserted and has a predetermined period T in such a manner that the scrambled signal in the SC mode is descrambled at the receiving-side apparatus even during the program. For this reason, when the ID code is received during the SD mode, the sending-side scrambler and the receiving-side descrambler are temporarily set in the SC mode. In this case, in order to reset the SD mode from time $t_5$, the SB and SD codes are inserted at time $t_6$ immediately after the ID code is inserted. The signal scrambled in the SD mode can thus be descrambled even during the program.

At the receiving side in the scrambled broadcast, the ID, SC, SB, SD, SS and key codes are detected to reproduce the scrambling patterns of the respective modes. Descrambling is performed in such a manner that the polarities of the signals are inverted in accordance with the corresponding scrambling patterns.

Figure 6:
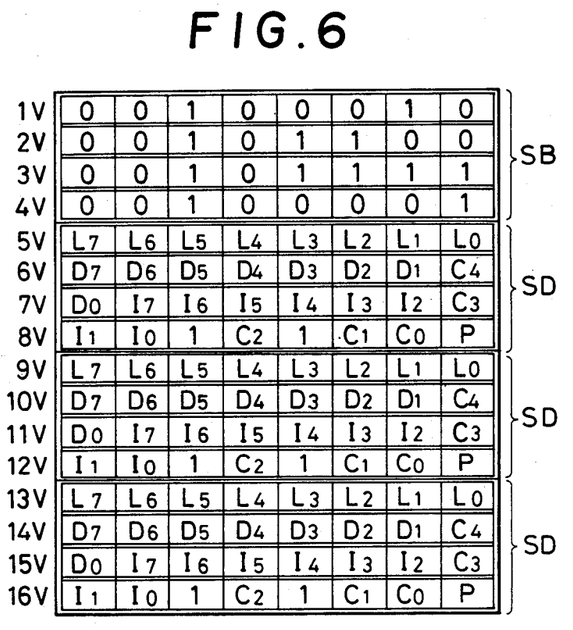
FIG. 6 shows an embodiment of a format of SB and SD codes.
Figure 7:
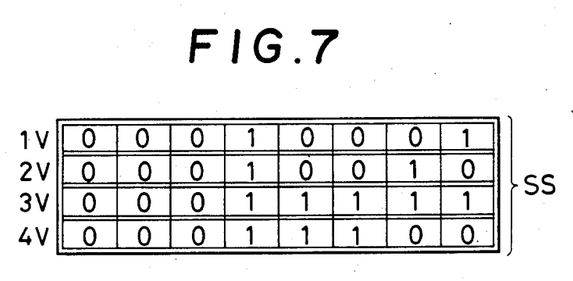
FIG. 7 shows an embodimment of a format of an SS code.

An embodiment of the data formats of the SB, SD and SS codes is described next. FIG. 6 shows the SB and SD codes, and FIG. 7 shows the SS code. It should be noted that these codes are inserted in 17H and 18H periods during the vertical blanking period.

Referring to FIG. 6, the SB and SD codes are transmitted for consecutive 16V periods between 1V and 16V period. The SB code has a 32-bit code pattern between the 1V and 4 V periods. In this case, the 17H period in the vertical blanking period is divided into 8 periods. Each period is assigned with the corresponding bit. The same code pattern as described above is also arranged in the 18H period.

The SD codes having the same code pattern are transmitted between the 5V and 8V periods, between the 9V and 12V periods and between 13V and 16V periods, respectively. Each SD code includes a combination of bit data $L_0$ to $L_7$ which represent the period L of FIG. 4, bit data $D_0$ to $D_7$ which represent the inversion period D, and bit data $I_0$ to $I_7$ which represent the lag period I. In addition, error detection humming code data 1, $C_0$ to $C_2$, and P are selectively added to the combination. The SD code is repeatedly transmitted three times. After error correction is performed by the error detection humming code at the receiving-side, the bits of the SD codes transmitted three times are compared to perform error correction in accordance with the majority decision. According to this error correction method, the error rate of the data can be decreased to a negligible level.

The SS code comprises a 32-bit pattern transmitted for consecutive 4 V periods as shown in FIG. 7.

The code patterns of the SB, SD and SS codes during each V period respectively have humming distance of at least two bits. Therefore, the erroneous operations between every two adjacent fields can be minimized.

The apparatus for scrambling a television signal shown in FIG. 3 according to an embodiment of the present invention will be described with reference to FIG. 8.

Figure 8:
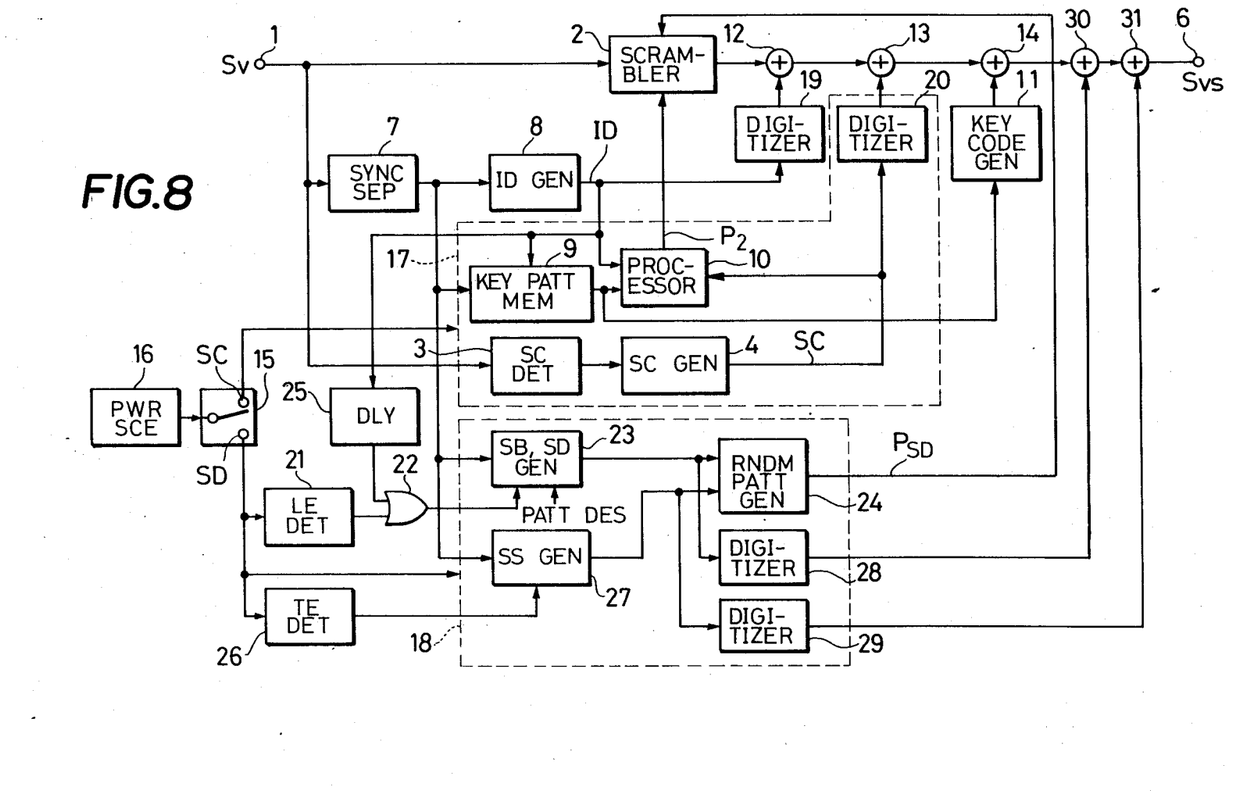
FIG. 8 is a block diagram showing an embodiment of an apparatus for scrambling a television signal.

Referring to FIG. 8, when scrambling is performed in the SC mode, a switch 15 is set in the SC position to supply a power source voltage from a power source circuit 16 to an SC mode setting section 17 surrounded by the dotted line. However, when scrambling is performed in the SD mode, the switch 15 is set in the SD position to supply the power source voltage from the power source circuit 16 to an SD mode setting section 18 similarly surrounded by the dotted line.

When a television signal is scrambled in the SC mode, a video signal $S_v$ of a specific program which is supplied to an input terminal 1 is supplied to a scrambler 2, a sync separator 7 and a scene change detector 3. An ID generator 8 generates a scene change identification signal ID having a period T in response to the horizontal and vertical sync signals separated by the sync separator 7. The scrambling pattern $P_1$ is read out from a key pattern memory 9 in response to the signal ID and the horizontal and vertical sync signals. The readout scrambling pattern $P_1$ is supplied to a processor 10 and a key code generator 11.

Meanwhile, an SC generator 4 generates a signal SC in response to an output from the scene change detector 3. The signal SC is supplied to the processor 10. The processor 10 produces a scrambling pattern $P_2$ (or $P_3$ or $P_4$) in accordance with the pattern $P_1$ and the signals ID and SC. The pattern $P_2$ (or $P_3$ or $P_4$) is supplied to the scrambler 2. The scrambler 2 inverts the polarity of the signal $S_v$ in response to the pattern $P_2$ representing the polarity inversion. The signals ID and SC are converted by digitizers 19 and 20 to digital signals, respectively. These digital signals are inserted by adders 12 and 13 in the predetermined periods of the scrambled signal, respectively. In addition, the key code for designating the pattern $P_1$ is supplied from the key code generator 11 to an adder 14 and is inserted in the scrambled signal.

However, when the television signal is scrambled in the SD mode (i.e., when the switch 15 is switched to the SD position), the power source voltage is applied to the SD mode setting section 18. At the same time, the leading edge of the power source voltage is detected by a leading edge detector 21. The detection signal from the leading edge detector 21 drives an SB and SD generator 23 through an OR gate 22. ($256 \times 255 \times 255 \times \frac{1}{2}$) scrambling pattern $P_{SD}$ in the SD mode shown in FIG. 4 can be obtained by selecting the data L, D and I. The SB and SD generator 23 sets one set of the data L, D and I upon an external operation. In response to the data L, D and I, a random pattern generator 24 generates the scrambling pattern $P_{SD}$. The scrambler 2 inverts the polarity of the signal $S_v$ in accordance with the pattern $P_{SD}$.

As previously described, when the signal ID is generated during the SD mode, the scrambling apparatus at the sending side and the descrambling apparatus at the receiving side are temporarily set in the SC mode but are immediately reset in the SD mode. For this purpose, the SB and SD generator 23 is driven by a signal obtained by delaying the signal ID by a delay circuit 25 by a predetermined delay time and gating this delayed signal through the OR gate 22. It should be noted that the delay time of the delay circuit 25 is a time interval between time $t_5$ and time $t_6$ of FIG. 5.

In order to terminate the SD mode, the switch 15 is changed to the SC position again. In this case, the trailing edge of the power source voltage is detected by a trailing edge detector 26. The detection signal from the trailing edge detector 26 drives an SS generator 27 which then generates the signal SS. The random pattern generator 24 is then stopped in response to the signal SS.

The signals SB and SD are converted by a digitizer 28 to digital signals as shown in FIG. 6, and the signal SS is converted by a digitizer 29 to a digital signal as shown in FIG. 7. The digital signals from the digitizer 28 and the digital signal from the digitizer 29 are inserted by adders 30 and 31 in the predetermined periods of the scrambled signal, respectively. Therefore, a scrambled signal $S_{vs}$ appears at an output terminal 6. It should be noted that predetermined codes such as a program code and an address code are inserted in the scrambled signal $S_{vs}$.

The descrambler at the receiving side extracts the signals ID, SC, SB, SD, SS and key code from the signal $S_{vs}$. The scrambling patterns $P_2$ and $P_{SD}$ are obtained in accordance with the extracted signals, and the polarity of the video signal is reinverted. In the above description, the video signal is scrambled. However, when the television signal consisting of the video signal and the audio signal is scrambled in accordance with the scrambling pattern of the video signal, descrambling can be easily performed.

The enciphering of the SD code will be described. The scrambling pattern $P_{SD}$ in the SD mode can be understood at the receiving apparatus which does not have a descrambler. For example, the signal waveform of the scrambled video signal can be observed to analyze the scrambling pattern $P_{SD}$. When the scrambling pattern $P_{SD}$ is known to a nonsubscriber, he can receive the scrambled video signal and can enjoy the scrambled program as a normal program. According to this embodiment, the SD code is enciphered to inhibit the nonsubscriber from watching the scrambled program as the normal program.

Figure 9:
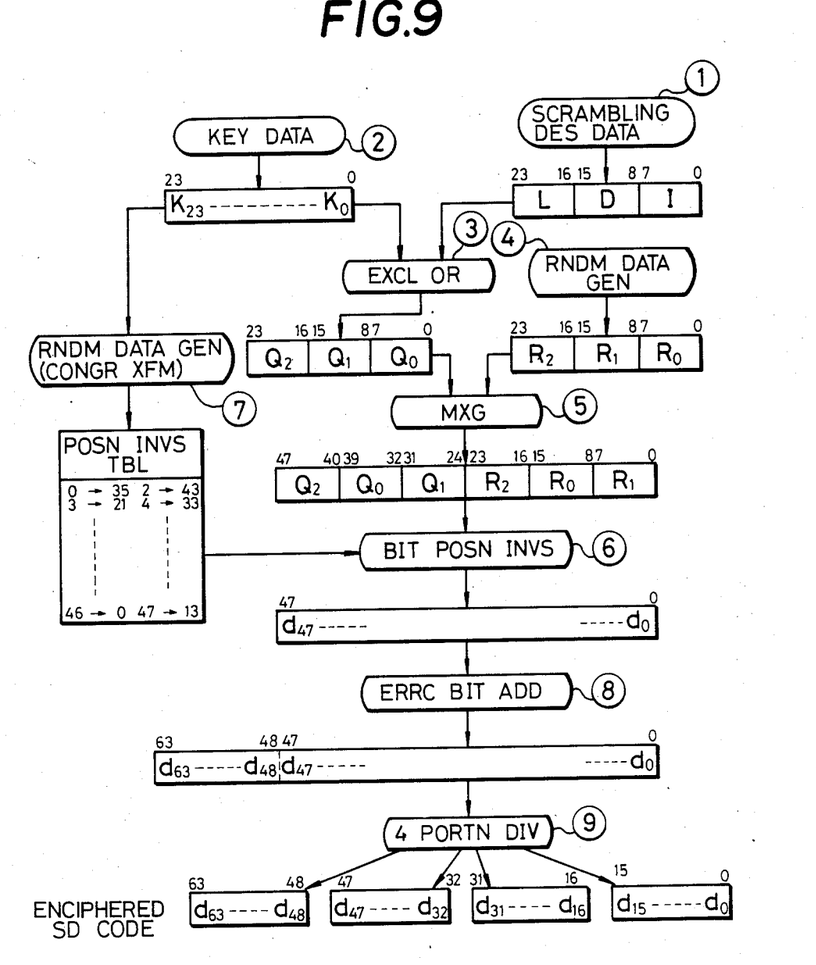
FIG. 9 is a flow chart for explaining enciphering of the SD code.
Figure 10:
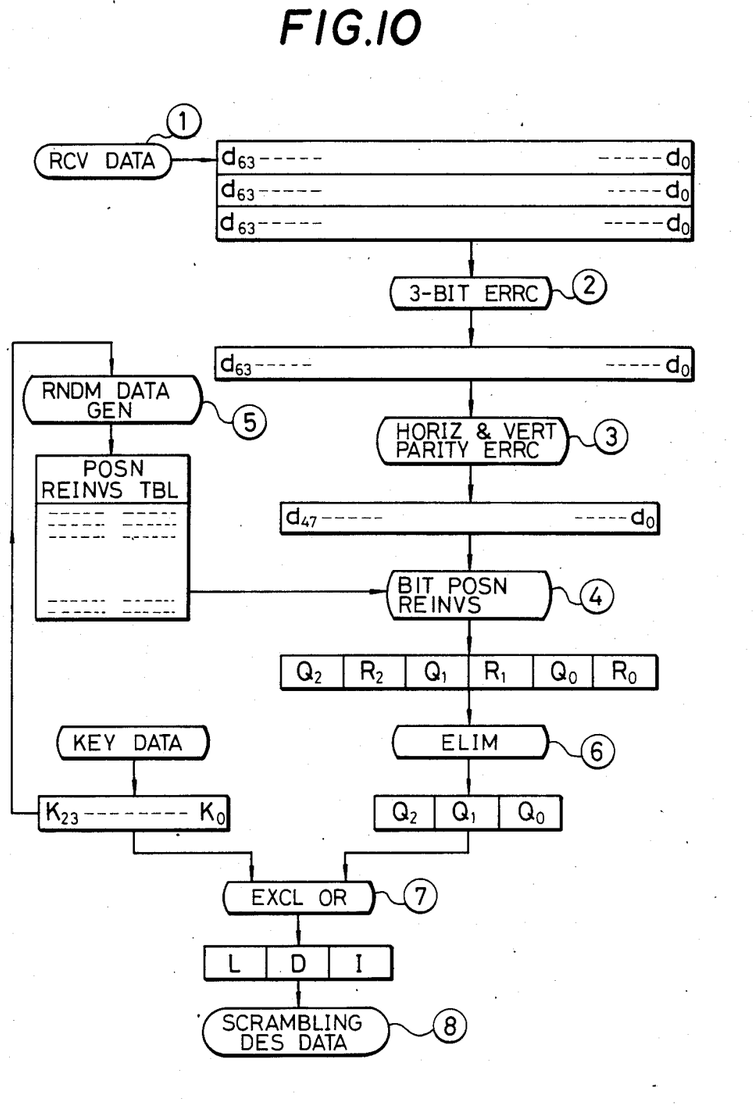
FIG. 10 is a flow chart for explaining deciphering of the enciphered SD code.

FIG. 9 is a flow chart for explaining enciphering of the SD code at the sending side, and FIG. 10 is a flow chart for explaining deciphering of the SD code at the receiving side.

Referring to FIG. 9, in step ①, the scrambling designation data (i.e., 24-bit data consisting of data L, D and I of the SD code) is prepared. In step ②, key data as the key for scrambling the data is prepared. The key data comprises, for example, 24 bits consisting of $K_0$ to $K_{23}$. In this case, a special code may be assigned to the key data. However, in this embodiment, a 24-bit program code as previously described is used. In step ③, the key data and the data of L, D and I are logically exclusive-ORed, thereby obtaining data $Q_0$, $Q_1$ and $Q_2$.

Meanwhile, in step ④, random data are generated to prepare any random data $R_0$, $R_1$ and $R_2$. The random data $R_0$, $R_1$ and $R_2$ and the data $Q_0$, $Q_1$ and $Q_2$ are mixed in step ⑤ to constitute 48-bit data. The 48-bit data is subjected to bit position inversion in step 501 ⑥. In this case, the bit position inversion table obtained by generation of the random data by the congruent transformation in step ⑦ which is performed on the basis of the key data is used. The position inversion table is used to invert the order of bit positions of the 48-bit data. Tables of the factorial of 48 can be considered, but a predetermined number of tables are prepared. The given tables are selected in accordance with a program. The order of the bit positions is inverted on the basis of the position inversion table to obtain data of bits $d_0$ to $d_{47}$. A 16-bit error correction bit is added to this data to obtain data of bits $d_0$ to $d_{63}$ in step ⑧. The resultant data is divided into four portions respectively corresponding to 4V periods in step ⑨, thereby obtaineing the enciphered SD code in step ⑨. The enciphered SD code is transmitted three times after the SB code.

Referring to FIG. 10, the enciphered SD code of bits $d_0$ to $d_{63}$ is received three times in step ①. Three data are subjected to 3-bit error correction in accordance with the majority decision method in step ②. In this error correction, every three corresponding bits of the bits $d_0$ to $d_{63}$ of the three data are compared with each other. If two of the three identical bits have the same logic level, they are detected to be true. For example, the logic levels of the three identical bit $d_0$ are set at logic "0", "0" and "1", logic "0" is detected to be true.

After this 3-bit error correction, the data of $d_0$ to $d_{63}$ is subjected to horizontal and vertical parity error correction in step ③. This error correction is performed by using the error correction bits $d_{48}$ to $d_{63}$ added in step ⑧ in FIG. 9. After the horizontal and vertical parity error correction, the data of $d_0$ to $d_{47}$ is subjected to bit position reinversion in step ④. In this case, the bit position reinversion table obtained by the generation of the random data in step ⑤ which is performed on the basis of the key data is used. According to the bit position reinversion, the data of the inverted order of bit positions on the basis of the bit position inversion table of FIG. 9 is reinverted to the normal order of bit positions.

The random data $R_0$, $R_1$ and $R_2$ are eliminated from the data having the normal order of bit positions, and the resultant data thus comprises only data $Q_2$, $Q_1$ and $Q_0$ in step ⑥. The data $Q_2$, $Q_1$ and $Q_0$ and the key data are logically exclusive-ORed in step ⑦. As a result, the original SD code having the data of L, D and I can be obtained.

The enciphering and deciphering methods described above can easily be performed by a commercially available 8-bit microprocessor. In addition, since the key data is used, the secrecy of the scrambled video signal can be maintained even if the enciphering process is understood.

According to the present invention as described above, the SD mode is used to improve the scrambling effect of the scrambled broadcast signal for maintaining the secrecy of the scrambling process when the scene change is small. In addition, the signal for designating the polarity-inverted portion is transmitted from the television station to facilitate the descrambling operation at the receiving side. In addition, this signal is further enciphered to maintain the secrecy of the broadcasting, thereby preventing reception by nonsubscribers.

What is claimed is:

1. Apparatus for scrambling a television signal by inversion thereof, comprising:
   means for detecting a change in the scene represented by the television signal and generating a scene change identification signal in response thereto;
   means for generating a key code signal having a predetermined pattern;
   means for combining said scene change identification signal and said key code signal to produce a first control signal;
   means for producing a second control signal, said second control signal having a random pattern including a plurality of periods each having an inversion portion and a non-inversion portion;
   means for scrambling the television signal in response to a selected one of said first control signal and said second control signal;
   switching means for supplying a selected one of said first control signal and said second control signal to said scrambling means; and
   means for generating a starting code signal and a stopping code signal which respectively indicate the start and the end of said second control signal, said starting and stopping code signals being produced in response to said switching means and supplied to said second control signal producing means.

2. Apparatus according to claim 1, further comprising switching means for switching the control signal which is supplied to said scrambling means between said first control signal and second control signal.

3. Apparatus according to claim 2, further comprising means for generating a starting code signal and a stopping code signal which respectively indicate the start and the end of said second control signal, said starting and stopping code signals being produced in response to said switching means and supplied to said second control signal producing means.

4. Apparatus according to claim 3, in which said switching means is connected to a power supply source and supplies the power therefrom to a selected one of said detecting means, said key code generating means and said combining means, and said second control signal producing means.

5. A method of scrambling a television signal by inversion thereof, comprising the steps of:
- detecting a change in the scene represented by the television signal and generating a scene change identification signal in response thereto;
- generating a key code signal having a predetermined pattern;
- combining said scene change identification signal and said key code signal to produce a first control signal;
- producing a second control signal, said second control signal having a random pattern including a plurality of periods each having an inversion portion and a non-inversion portion;
- generating a starting code signal and a stopping code signal for said second control signal;
- controlling the production of said second control signal with said starting code signal and said stopping code signal; and
- scrambling the television signal in response to a selected one of said first control signal and said second control signal.

6. A method according to claim 5, further comprising the steps of:
- generating a starting code signal and a stopping code signal for said second control signal; and
- controlling the production of said second control signal with said starting code signal and said stopping code signal.

* * * * *